United States Patent Office 2,719,149
Patented Sept. 27, 1955

2,719,149

PREPARATION OF CRYSTALLINE POTASSIUM PENICILLIN

Charles J. Salivar, Malverne, and Ellis V. Brown, Glen Head, N. Y., assignors to Chas. Pfizer & Co., Inc., Brooklyn, N. Y., a corporation of Delaware No Drawing. Application October 8, 1952, Serial No. 313,804

5 Claims. (Cl. 260—239.1)

This invention relates to an improved method for the preparation of crystalline potassium penicillin.

It has been reported, Chemistry of Penicillin O. S. R. D. Committee, Science vol. 102, p. 627 (1945), that there are a number of antibiotics of the penicillin class known which have the empirical formula $C_9H_{11}O_4SN_2$—R. Penicillin G, F, dihydro F, K and X are all naturally occurring penicillins in which "R" is benzyl, 2-pentenyl, n-pentyl, heptyl and p-hydroxybenzyl, respectively. Penicillin produced commercially is preponderantly penicillin G with a minor proportion of one or more of the other penicillins mentioned. In this application the term "penicillin" without further qualifications is intended to denote penicillin G containing only minor proportions of the other penicillin species.

Crystalline penicillin salts of alkali metals, for example the potassium salt, have been previously known. The alkali metal salts of penicillin are, however, extremely soluble in water, and methods heretofore known for crystallizing them have employed organic solvents under nearly anhydrous conditions. This has been expensive and inconvenient.

An object of this invention is to provide a novel and improved process for the preparation of crystalline potassium penicillin. Another object is to provide a process for the direct preparation of crystalline potassium penicillin from concentrates of penicillin produced from fermentation broths by commercial methods. A still further object is to provide a process for producing pure white crystalline potassium penicillin directly from aqueous solution. Further objects will appear hereinafter.

It has now been found that an aqueous solution of a water-soluble penicillin salt can be treated with potassium acetate in a sufficient concentration to cause the precipitation of crystalline potassium penicillin directly from the aqueous solution. This product can be recovered from the solution in highly pure form merely by filtration or similar means of separating the solid product.

Although dilute solutions of the penicillin salts, e. g. a solution containing 2,000 units per ml. can be used, it is preferred to prepare the crystalline potassium penicillin salt from aqueous solutions containing between 100,000 and 350,000 units per ml. Solutions having a great deal higher concentration of a penicillin salt (e. g. up to about 2,000,000 units per ml.) may be used in the process of this invention although these are not often met in the earlier stages of commercial operations involving the purification and crystallization of penicillin. The potassium acetate salt may be added as a solid or in the form of a solution, preferably a saturated aqueous solution.

According to one preferred embodiment of the invention maximum yields of crystalline product are obtained by adding solid potassium acetate to an aqueous concentrate of sodium, potassium, ammonium or other water-soluble penicillin salt, as derived from fermentation broths. The particular quantity of acetate reactant to be added will necessarily vary with the concentration of the penicillin solution and the nature of the water-soluble penicillin salt. As previously indicated, an amount of acetate salt should be added which will effect precipitation of the desired crystalline potassium penicillin. Thus, sufficient solid reagent may be introduced to provide a solution saturated with respect thereto. Alternatively, a saturated aqueous solution of the potassium acetate may be added to the aqueous penicillin medium, in which case of course, the content of acetate in the total liquid will be below saturation. It is generally preferred to operate with the potassium acetate content of the medium in the range of substantially between 25% and 75% by weight. It is obviously feasible to form potassium penicillin in solution in situ and thereafter precipitate it, all in substantially one operation, by treating another penicillin compound with potassium acetate in sufficient quantities both to react with that other compound and form water-soluble potassium penicillin and then to crystallize out the latter.

The reason for the peculiar efficacy of potassium acetate in this reaction is not exactly understood. Its activity is specific, e. g. an inorganic potassium salt will not function in the same way, nor will other metal acetates. Furthermore, the process of this invention is operated in a non-organic solvent medium, whereas it has heretofore been thought necessary to extract penicillin salts in an organic solvent. One would have expected potassium penicillin, in view of its high water-solubility, simply to remain in solution in water after the treatment with potassium acetate, which also is highly water-soluble. The reverse of this expectation, however, is in fact the case. The potassium acetate treatment causes precipitation of potassium penicillin directly from a water medium, and the need for complex organic solvent extractions and re-extractions heretofore required is obviated.

In view of the fact that potassium penicillin is only slightly soluble in concentrated potassium acetate solution, high recoveries of crystalline potassium penicillin are possible, for example 66% aqueous potassium acetate dissolves only 1,400 units of penicillin G per ml. at 25° C.

The potassium salts of other penicillin species, such as F and K, are considerably more soluble in concentrated aqueous potassium acetate solutions than is the potassium salt of penicillin G. Therefore, in a solution containing penicillin G along with other species, the recoverable crystalline potassium penicillin salt is higher in penicillin G than the starting material. Commercially, this is an advantageous result of the process of this invention.

The non-penicillin, highly colored, acidic by-products occurring in crude penicillin concentrates obtained from fermentation broths do not co-crystallize with the crystalline potassium penicillin prepared in accordance with this invention, and are therefore easily separated from the desired crystalline potassium penicillin by filtration of the crystals and washing with a strong solution of the potassium acetate. The residual potassium acetate adhering to the crystals after filtration can be removed by washing with a solvent for potassium acetate and non-solvent for potassium penicillin, e. g. isopropanol. The resulting crystalline potassium penicillin after drying is of high purity and suitable for clinical use.

This invention has the advantage of providing crystalline potassium penicillin salts high in penicillin G directly from aqueous penicillin concentrates obtained from fermentation broths. It has the further advantage that colored and odoriferous substances usually present in such crude concentrates are left in solution. Another important advantage is the elimination of the use of organic solvents in connection with crystallization procedures and the preparation of potassium penicillin suitable for clinical use by a direct precipitation and washing procedure.

Very crude penicillin preparations, that is, materials having a potency as low as 600 units per mg. or even less, may be used in the present process. The advantages of being able to use such crude materials to prepare crystalline potassium penicillin of much higher potency is obvious. The yield of the crystalline salt and its purity are somewhat dependent on several interrelated factors. These include: the potency of the starting material, the concentration of the penicillin in the solution from which the crystalline material is prepared, the proportion of the G and non-G species of penicillin present in the starting material, the concentration of potassium acetate, the temperature at which crystallization is conducted and so forth. However, it should be emphasized that under a variety of conditions, utilizing relatively crude penicillin preparations a good yield of crystalline potassium penicillin is prepared. The optimum conditions for use with any given sample of penicillin may readily be determined.

The invention may be more readily understood by a consideration of the following examples which are illustrative only. As many apparently widely different embodiments of this invention may be made without departing from the spirit and scope hereof, it is to be understood that the invention is not limited to the specific embodiments hereof, except as defined in the appended claims.

This application is a continuation-in-part of application Serial No. 103,535 filed July 7, 1949, now abandoned, and in turn of the parent application of the latter, Serial No. 748,338 filed May 15, 1947, and now abandoned.

*Example I*

One cc. of sodium penicillin concentrate containing 1,650,000 units of penicillin was treated with 5 cc. of a solution prepared from 250 gm. of potassium acetate and 100 gm. of water. Potassium penicillin crystallized and the precipitate was filtered off and washed with 5 ml. of saturated potassium acetate solution. Upon drying the precipitate was found to contain 92% of the original penicillin as crystalline potassium penicillin mixed with potassium acetate.

Similarly good results may be obtained by substituting for sodium penicillin in the above example calcium, ammonium and other water-soluble penicillin salts.

*Example II*

A batch of penicillin fermentation broth was acidified to pH 2.5 and extracted with one third of its volume of methyl isobutyl ketone. The solvent containing the penicillin was extracted with a 2% aqueous solution of disodium phosphate until all the penicillin was transferred to the phosphate solution. The phosphate extract was acidified with phosphoric acid to pH 2.0 and again extracted with one third volume methyl isobutyl ketone. From this solvent extract the penicillin was taken up by a 15% potassium bicarbonate aqueous solution. Fifty-eight cc. of penicillin concentrate were obtained containing 16.7 million units of penicillin. To this solution were added gradually 70 gm. of potassium acetate while stirring and cooling with tap water. Crystallization took place during the gradual addition of the potassium acetate. After stirring for an additional thirty minutes the crystal magma was filtered, washed first with 20 cc. of 50% aqueous potassium acetate solution and then with 50 cc. of isopropanol. The dried product weighed 9.0 gms. (14.2 million units). This is a yield of 85%. The potassium penicillin had the optical rotation $(\alpha)_D^{25}+285°$ and a bio-assay of 99%.

*Example III*

One gm. potassium penicillin, containing 90% G and 10% F+dihydro F, was dissolved in 10 ml. of water. To this 4.0 gms. potassium acetate were added gradually with stirring. The crystalline potassium penicillin was filtered on a suction filter and washed with isopropanol. Pure potassium penicillin $(\alpha)_D^{25}+285°$ was obtained.

*Example IV*

A sample of sodium penicillin weighing 14.5 grams and assaying 1200 units per mg. was dissolved in 15 ml. of water. A solution of 50 grams of anhydrous potassium acetate in 35 ml. of water was added to the penicillin solution. After the mixture was stirred for a short time the crystalline product was filtered and washed with a saturated solution of a mixture of dipotassium acid phosphate and monopotassium acid phosphate. The product was dried. It weighed 11.6 grams and had a potency of 1200 units per mg.

We claim:

1. A process for producing crystalline potassium penicillin which comprises adding to an aqueous solution of a water-soluble salt of penicillin selected from the class consisting of sodium, potassium, calcium and ammonium salts, a sufficient quantity of potassium acetate to precipitate a solid directly from said aqueous solution, allowing the solution to stand until the solid crystalline potassium penicillin has formed and recovering said crystalline product from the solution.

2. The process of claim 1 wherein the water-soluble salt of penicillin is sodium penicillin.

3. The process of claim 1 wherein the water-soluble salt of penicillin is potassium penicillin.

4. The process of crystallizing potassium penicillin from aqueous solution, which comprises adding to an aqueous solution of a water-soluble salt of penicillin containing at least 2,000 units of penicillin per ml. and selected from the class consisting of sodium, potassium, calcium and ammonium salts, sufficient solid potassium acetate to precipitate a solid directly from the aqueous solution, thereby precipitating solid crystalline potassium penicillin, and separating the precipitate from the solution.

5. The process of claim 4 wherein the initial penicillin solution contains substantially between 100,000 and 350,000 units per ml.

References Cited in the file of this patent

UNITED STATES PATENTS

| | | |
|---|---|---|
| 2,496,848 | Bernhart | Feb. 7, 1950 |
| 2,520,099 | Hodge | Aug. 22, 1950 |
| 2,580,364 | Senkus | Dec. 25, 1951 |
| 2,599,401 | Leighty | June 3, 1952 |

FOREIGN PATENTS

| | | |
|---|---|---|
| 22,908 | Cuba | June 30, 1948 |
| 622,988 | Great Britain | May 10, 1949 |
| 969,184 | France | May 17, 1950 |